United States Patent [19]
Schabert et al.

[11] Patent Number: 5,402,456
[45] Date of Patent: Mar. 28, 1995

[54] NUCLEAR REACTOR SYSTEM AND METHOD FOR OPERATING THE SAME

[75] Inventors: Hans-Peter Schabert, Erlangen; Horst Weisshaeupl, Herzogenaurach; Dietmar Bittermann, Fuerth; Andreas Goebel, Neunkirchen A. Brand, all of Germany

[73] Assignee: Siemens Aktiengesellschaft, Munich, Germany

[21] Appl. No.: 41,759

[22] Filed: Apr. 2, 1993

[30] Foreign Application Priority Data

Apr. 2, 1992 [DE] Germany ............. 42 11 030.0

[51] Int. Cl.⁶ ........................................... G21C 9/016
[52] U.S. Cl. ................................................. 376/280
[58] Field of Search .............. 376/280; 976/DIG. 143

[56] References Cited

U.S. PATENT DOCUMENTS

| | | | |
|---|---|---|---|
| 4,045,284 | 8/1977 | Rosewell | 376/280 |
| 4,240,875 | 12/1980 | Katscher | 376/280 |
| 5,049,352 | 9/1991 | Tutu et al. | 376/280 |
| 5,057,271 | 10/1991 | Turricchia | 376/280 |
| 5,080,857 | 1/1992 | Miller et al. | 376/280 |

FOREIGN PATENT DOCUMENTS

| | | |
|---|---|---|
| 0392604 | 10/1990 | European Pat. Off. |
| 2525554 | 6/1976 | Germany . |
| 2459339 | 7/1976 | Germany . |
| 2925680 | 10/1980 | Germany . |
| 2840086 | 9/1981 | Germany . |
| 2030347 | 4/1980 | United Kingdom . |
| 2052133 | 1/1981 | United Kingdom . |

OTHER PUBLICATIONS

Patent Abstract of Japan No. JP 2-136789 (Tadashi Kume), May 25, 1990.
Patent Abstract of Japan No. JP 2-222872 (Makoto Akinaga) Sep. 5, 1990.
Emergency Nuclear Energy Systems 1989, pp. 19–24, Proceedings of the fifth Int. Conference on Emergency.
VGB Kraftwerkstechnik Publication No. 7, Jul. 1988, (H. Bartsch), pp. 694–698, "Massnahme zur Begrenzung . . . ".

Primary Examiner—Daniel D. Wasil
Attorney, Agent, or Firm—Herbert L. Lerner; Laurence A. Greenberg

[57] ABSTRACT

A nuclear reactor system having a water-cooled reactor includes a reactor containment. A shielding pit inside the reactor containment has a lower region with an outlet opening formed therein. A reactor pressure vessel is disposed in the shielding pit. A moderating cell is disposed downstream of the outlet opening and has a device for slowing down and diverting a melt flowing through the outlet opening. A catch basin is disposed downstream of the moderating cell for receiving a melt and a supply of water. A method for operating a nuclear reactor system includes covering the bottom of the catch basin with water during normal operation of the reactor, and maintaining the water in the catch basin at a surface level being lower than the lowermost region of the bottom of the shielding pit.

21 Claims, 5 Drawing Sheets

NUCLEAR REACTOR SYSTEM AND METHOD FOR OPERATING THE SAME

SPECIFICATION

The invention relates to a nuclear reactor system having a collector apparatus for a reactor core in melt down.

In the case of a hypothetical serious accident in a nuclear power system with a water-cooled reactor, it can be assumed that the reactor core will melt and then emerge from the underside of the reactor pressure vessel to enter the shielding pit of the reactor containment. In order to enable control of such an accident, suitable structural provisions must be made in order to prevent the molten material, which under some circumstances, with overpressure, might emerge from the reactor pressure vessel and collect in the bottom region of the nuclear power system, from causing failure of the reactor containment.

By way of example, German Patent DE 28 40 086 C2 discloses a nuclear reactor system with a collector apparatus for a reactor core in meltdown, in which a vertical drainage channel is provided below the shielding pit that surrounds the reactor pressure vessel. This drainage channel penetrates the reactor containment and leads into a pit for molten material, or melt, disposed underneath the reactor containment. There, the molten material emerging from the reactor pressure vessel is distributed over an absorber bed, which is formed by a steel tub filled with water-free substances. Once that steel tub has melted, the melt reaches the bottom of the pit for molten material. The bottom and side walls of the pit for molten material are also water-cooled, so that the melt gradually solidifies.

In the nuclear reactor system known from German Patent DE 29 25 680, a catch tub disposed under the level of the reactor foundation is likewise provided for receiving the molten material. The catch tub is not located directly underneath the reactor core but rather beside it, and it communicates with the bottom of the reactor building through a chute extending horizontally outward over the catch tub.

However, under unfavorable conditions, it is impossible in such known constructions for receiving the core melt, to prevent water from having entered or entering the catch chamber even before or during the outflow of the melt. That can mean that the melt will strike water directly at high speed and be fragmented there, causing a very forceful sudden production of steam.

In the publication Emerging Nuclear Energy Systems 1989, Icenes '89, Karlsruhe, July 3–6, regarding the Proceedings of the Fifth International Conference on Emerging Nuclear Energy Systems, pages 19 through 24, FIG. 1 discloses a core melt catch apparatus in which a cooled catch tub is disposed inside the reactor containment, directly underneath the reactor pressure vessel. In the tub, the melt can spread over a large area and can cool down in direct contact with water. The steam produced by the heat of decay of the melt condenses in the upper part of the steel shell of a reactor containment and from their flows back to the core melt catch apparatus. Once again, however, in that known nuclear reactor system it cannot be precluded that some water will collect in the catch tub and in the shielding pit even before the failure of the reactor pressure vessel, so that at the instant of reactor pressure vessel failure the risk exists that the emerging melt can strike the surface of the water directly and at high speed. Once again, that can cause pronounced fragmentation of the melt and very forceful steam production, which threatens the reactor containment.

It is accordingly an object of the invention to provide a nuclear reactor system with a water-cooled reactor disposed in a reactor pressure vessel and a method for operating the same, which overcome the hereinafore-mentioned disadvantages of the heretofore-known devices and methods of this general type and in which the forcefulness of steam production can be reduced considerably in the event of failure of the reactor pressure vessel.

With the foregoing and other objects in view there is provided, in accordance with the invention, a nuclear reactor system having a water-cooled reactor, comprising a reactor containment; a shielding pit inside the reactor containment, the shielding pit having a lower region with an outlet opening formed therein; a reactor pressure vessel disposed in the shielding pit; a moderating cell being disposed downstream of the outlet opening and having a device for slowing down and diverting a melt flowing through the outlet opening; and a catch basin downstream of the moderating cell for receiving a melt and a supply of water.

As a result of the device which is disposed in the moderating cell for slowing down and deflecting the problematic melt, the speed of the melt is reduced before it strikes the water supply in the catch basin, and fragmentation of the melt is suppressed. The lesser fragmentation of the melt reduces the surface area of the melt that comes into contact at any given moment with the water. Accordingly, the quantity of steam formed per unit of time is lowered to a rate that can spread out without danger to existing pressure relief openings in the reactor containment.

In accordance with another feature of the invention, the catch basin has a flat bottom, which is located lower than the lowermost region of the bottom of the shielding pit, so that the melt can flow out and the catch basin can receive a supply of water having a surface which is also located lower than the lowermost region of the bottom of the shielding pit.

In accordance with a further feature of the invention, the catch basin is dimensioned in terms of its position and size in such a way that the surface level of the supply of water for cooling the melt and coolant added from possible leakage, is always lower than the lowermost regions of the bottom of the shielding pit and of the bottom of the moderating cell. As a result of this provision, it is assured that even upon adding coolant to the water supply in the catch basin as a result of leakage from the primary coolant loop, the bottom of the shielding pit and the moderating cell can be kept dry before the melt is expelled from the reactor pressure vessel, so that when the melt emerges from the reactor pressure vessel it cannot directly strike any surface of water.

In accordance with an added feature of the invention, the bottom of the catch basin is located at least one meter below the lowermost region of the bottom of the shielding pit. In accordance with an additional feature of the invention, the bottom of the moderating cell is located at least one meter above the bottom of the catch basin.

In accordance with yet another feature of the invention, the catch basin has a basic area of at least 100 m².

In accordance with yet a further feature of the invention, the moderating cell has an additional upper relief opening for steam, through which the water-steam that has spilled over with the melt from the shielding pit can flow out from the moderating cell into the upper region of the reactor containment.

In accordance with yet an added feature of the invention, the shielding pit has an upper region with a pressure relief opening. Through it, water-steam with a slight component of melt can escape into a chamber and from there into the reactor containment, so that the driving differential pressure at the lower outlet opening becomes less. This calms the flow of melt in the region of the outlet opening.

In accordance with an added feature of the invention, there is provided an additional device associated with the pressure relief opening, for slowing down and deflecting a mixture of steam and melt emerging through the pressure relief opening.

In accordance with yet an additional feature of the invention, in order to facilitate an outflow of the melt from the shielding pit, the shielding pit has a bottom with a descending slope in the direction of the outlet opening.

In accordance with an added feature of the invention, the shielding pit and the moderating cell have bottoms and walls formed of concrete with a thickness of at least one meter.

In accordance with again another feature of the invention, the catch basin is located inside the reactor containment. In that case, the upper wall region of the reactor containment can serve as a cooling and condensation surface for the steam escaping from the water supply through the melt.

In accordance with again a further feature of the invention, there are provided one or more hollow chambers filled with water underneath the bottom of the moderating chamber.

In accordance with again a further feature of the invention, there is provided a hollow chamber or a plurality of water-filled channels underneath the bottom of the shielding pit as well. The hollow chamber and the channels preferably communicate with the water supply in the catch basin. Over the long term, any melt residues remaining on the bottom of the shielding pit or moderating cell could possibly penetrate the bottom of the shielding pit or moderating cell. In that case, the melt residues are received from this hollow chamber or channels and cooled, so that further penetration of the foundation structure and a breach of the sealed reactor containment are averted.

In accordance with again an added feature of the invention, in order to assure the calmest possible inflow of melt into the water supply in the catch basin, there is provided a steadily curved outlet channel discharging at a tangent onto the bottom of the catch basin.

In accordance with again an additional feature of the invention, since the melt in the discharge region of the outlet channel has not yet cooled down, the bottom has a fireproof lining. From there, the melt then spreads out over a large area, underwater, on the flat bottom of the catch basin.

In accordance with another feature of the invention, there is provided a plurality of moderating cells disposed at the circumference of the shielding pit.

In accordance with a further feature of the invention, the moderating cell annularly surrounds the shielding pit with a plurality of staggered inlet and outlet openings.

In accordance with a concomitant feature of the invention, there is provided a plurality of catch basins in a star pattern, and in particular two catch basins opposite one another, around the shielding pit, instead of a catch basin annularly surrounding the shielding pit. This is done in order to assure that the load-bearing structure can withstand a load in the region of the foundation even if the melt emerges into the catch basin.

With the objects of the invention in view, there is also provided a method for operating a nuclear reactor system, which comprises covering the bottom of the catch basin with water during normal operation of the reactor, and maintaining the water in the catch basin at a surface level being lower than the lowermost region of the bottom of the shielding pit.

Other features which are considered as characteristic for the invention are set forth in the appended claims.

Although the invention is illustrated and described herein as embodied in a nuclear reactor system and a method for operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
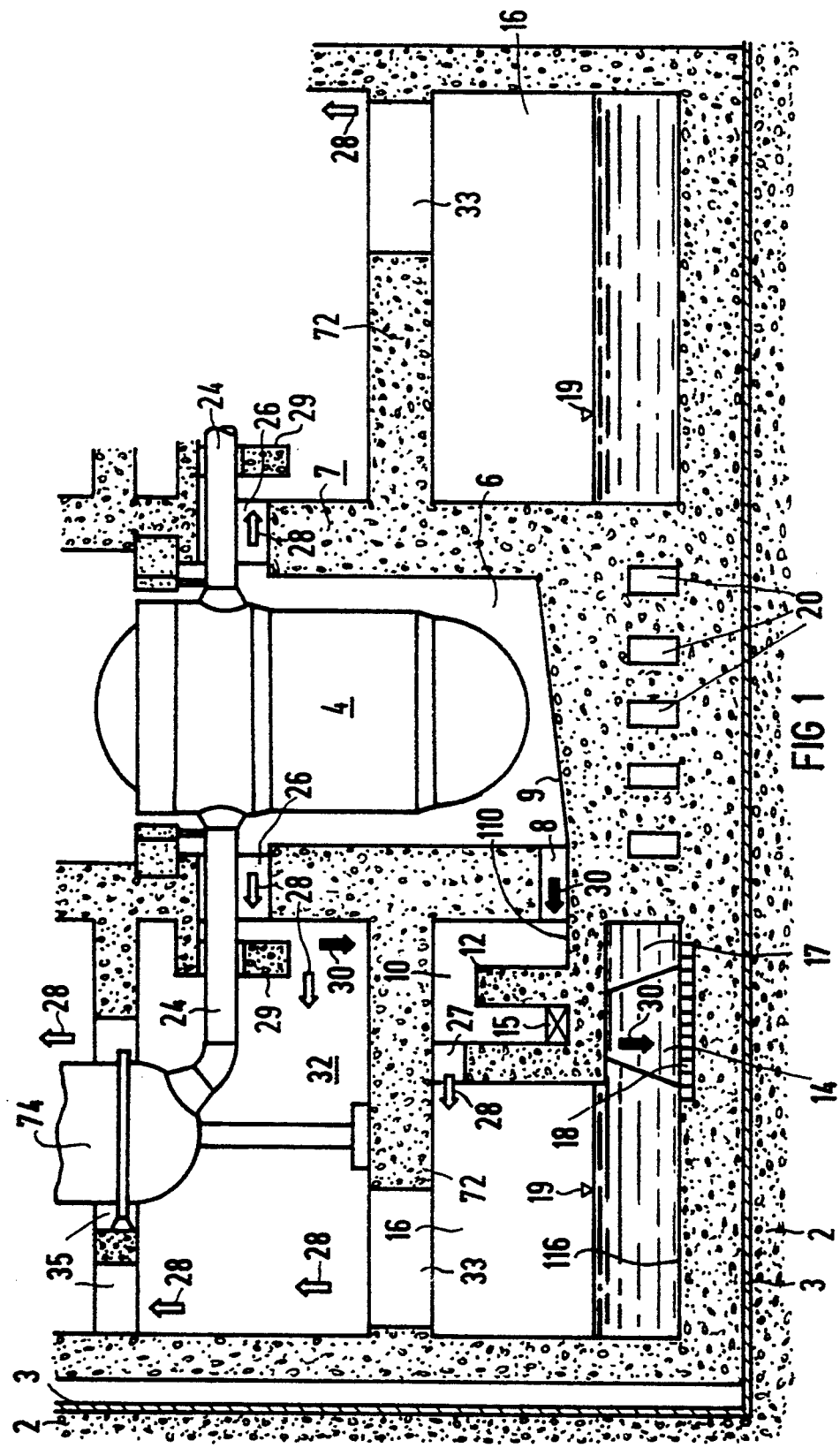
FIGS. 1 and 2 are respective fragmentary, diagrammatic vertical and horizontal-sectional views of a nuclear reactor system according to the invention.

Referring now to the figures of the drawing in detail and first, particularly, to FIG. 1 thereof, there is seen a reactor pressure vessel 4 which is disposed in a concrete structure 7 that surrounds and supports it and forms a shielding pit 6, in a reactor containment 2 of a nuclear reactor system. The reactor pressure vessel 4 contains a non-illustrated water-cooled reactor or reactor core. In the example shown in the drawing, the reactor containment 2 is cylindrical, is formed of concrete and is provided in the region of the foundation of the nuclear reactor system. In addition, a steel liner 3 may be disposed in a concrete jacket of the reactor containment 2. The reactor pressure vessel 4 is connected through primary coolant lines 24 to steam generators 74, of which only one is shown in the drawing.

The cylindrical shielding pit 6 preferably has a wall thickness of two meters and is provided at the level of its bottom 9 with a radial outlet opening 8 that discharges into a moderating cell 10 disposed next to the shielding pit 6. The moderating cell 10 is provided with walls having a wall thickness which is preferably approximately one meter, and it contains a device 12 for deflecting and slowing down a melt flowing at high speed through the outlet opening 8. The outlet opening is approximately 0.5 m² in size, for example. In the example shown in the drawing, this device 12 is a concrete wall protrusion, which also has a wall thickness of approximately one meter and is disposed transversely to the outlet opening 8, so that the melt flowing through the outlet opening 8 is deflected to the side and upward and is slowed down before flowing backward, as is seen in the drawing, into a drain channel 14 through an opening 15 disposed in a bottom 110 of the moderating cell 10.

The drain channel 14 leads underneath the moderating cell 10 to a bottom 116 of a catch basin 16 that annularly surrounds the shielding pit 6 in the example shown in the drawing. The bottom 116 of the catch basin 16 is flat and has a basic area of at least 100 m$^2$, and preferably approximately 400 m$^2$ for an assumed reactor heat output of 3800 MW. By way of example, the bottom 116 is located approximately one meter, and preferably approximately three meters to five meters, lower than the lowest region of the bottom 9 of the shielding pit 6, so that the molten reactor core emerging from the reactor pressure vessel 4 can drain out into the catch basin 16.

The catch basin 16 and the moderating cell 10 are provided with a common concrete ceiling 72, which at the same time serves as a support for the steam generator 74 disposed above it.

In the region of the ceiling 72, the moderating cell 10 is provided with a pressure relief opening 27 that discharges into the catch basin 16 and serves to calm the outflow of the melt into the drain channel 14. The catch basin 16 is likewise provided in the region of the ceiling 72 with large-area pressure relief openings 33, through which steam being produced can escape upward into a chamber 32 and can then escape upward into the reactor containment 2 through further pressure relief openings 35 disposed in the region of the ceiling of this chamber 32.

The drain channel 14 ends in the catch basin 16 in a region of the bottom 116 of the catch basin 16 that is provided with a fireproof lining 18, for instance a ceramic.

The catch basin 16 is preferably already filled during normal operation of the nuclear reactor system with 1500 m$^3$, for instance, of boric acid solution which may also be used for emergency cooling of the reactor in the case of an accident involving a leak. A level 19 of the water supply is lower than the lowermost region of the bottom of the shielding pit 6. It must be assured in this respect that additional coolant draining out into the catch basin 16, for instance from leakage, before the onset of a core melt down, which has a volume of the cooling water being on the order of magnitude of approximately 500 m$^3$ for instance, will not cause the resultant total level of the resultant surface level 19 of the water to exceed the level of the respective bottom 110 or 9 of the moderating cell 10 and the shielding pit 6, so that these chambers will reliably remain dry.

The moderating cell 10 protrudes in balcony-like fashion into the catch basin 16, so that a hollow chamber 17 filled with water is formed underneath the bottom of the moderating cell 10.

A plurality of coolant channels 20, that are likewise filled with boric acid solution and communicate with the water supply of the catch basin 16, are located underneath the shielding pit 6 inside the concrete bottom, for example at a depth of approximately two meters.

Water-steam emerging into the shielding pit 6 if the reactor pressure vessel 4 fails is removed through a pressure relief opening 26 that is disposed in the region of the primary coolant line 24. The water-steam flows into the chamber 32 and from there into the upper region of the reactor containment 2 through the opening 35. As a result, the quickest possible separation is achieved between the emerging melt and the water steam. Some residual quantity of melt may still be entrained with the water-steam emerging from the shielding pit 6 through the pressure relief opening 26. A deflection wall 29 disposed immediately behind this pressure relief opening 26 in the chamber 32 spins these melt residues downward by centrifugal force.

The white arrows 28 in the drawing indicate a flow of the water-steam. The course of the melt is indicated in the drawing by black arrows 30.

Through the use of prior pressure relief provisions, the internal pressure in the reactor pressure vessel 4 prior to the failure is reduced to a maximum of 20 bar. At the instant of the failure, this pressure acts as a propellant force for the molten reactor core, which emerges at high speed from the developing leakage opening in the reactor pressure vessel 4 and strikes the dry concrete of the walls or bottom 9 of the shielding pit 6. If the stream of melt is aimed directly at the outlet opening 8, then the melt flows through the outlet opening 8 at especially high speed and there strikes the device 12 in the moderating chamber 10. The melt is slowed down and deflected there. The flow speed of the melt is thus reduced prior to its reaching the drain channel 14, and the flow of melt is calmed.

The effective propelling differential pressure at the outlet opening 8 is markedly reduced by the pressure relief openings 26 disposed in the region of the primary coolant lines 24, through which the steam, emerging from the reactor pressure vessel 4 together with the melt, can escape quickly and effectively. This results in further calming of the melt spilling into the moderating cell 10.

The melt flows calmly and with little fragmentation through the drain channel 14 onto the boron-water-flooded flat bottom 116 of the catch basin 16, over which the melt spreads. Since the melt flows slowly downward out of the dry moderating cell 10 through the drain channel 14 and onto the lower-level floor of the catch basin 16, the contact area between the melt and the water as the melt strikes the surface of the water in the catch basin 16 is minimized, and spreading of the melt is facilitated. Therefore, only a little steam and only a few prematurely solidified chunks of melt develop, which could hinder the horizontal spreading of the melt along the bottom 116 of the catch basin 16.

After spreading out, the residual height of the melt should be no more than 10 to 20 cm. It then solidifies gradually as a consequence of the cooling action of the water located above it. The water-steam produced by the heat of decay of the melt escapes upward through the large-area pressure relief opening 33 in the ceiling 72 of the catch basin 16 and is condensed, for instance by a spray system. The condensed water-steam flows back into the catch basin 16, so that continuous cooling of the melt is assured.

Since the bottom 9 and the walls of the shielding pit 6 are preferably formed of concrete, they are capable of withstanding the enormously high impact forces resulting from the emergence of the melt at high speed, in the event of a failure of the reactor pressure vessel 4. However, concrete is sensitive to the action of heat persisting for a relatively long time. In order to cause the largest possible proportion of the melt to flow out of the shielding pit 6 within a few minutes, it is therefore advantageous to provide the bottom 9 of the shielding pit 6 with a descending slope of 10%, for example, in the direction of the outlet opening 8.

Nevertheless, after relatively long periods, localized destruction of the concrete at the bottom 9 or 110 of the shielding pit 6 and the moderating cell 10 from the heat of remaining melt residues cannot be precluded. The water-filled cooling channels 20 disposed below the shielding pit 6 with an adequately load-bearing covering of approximately one meter of concrete, and the hollow chamber 17 underneath the moderating cell 10 forming a barrier for instance, prevent the further advance of the core melt into the foundation for the liner 3 of the ground slab of the reactor containment 2.

Figure 2:
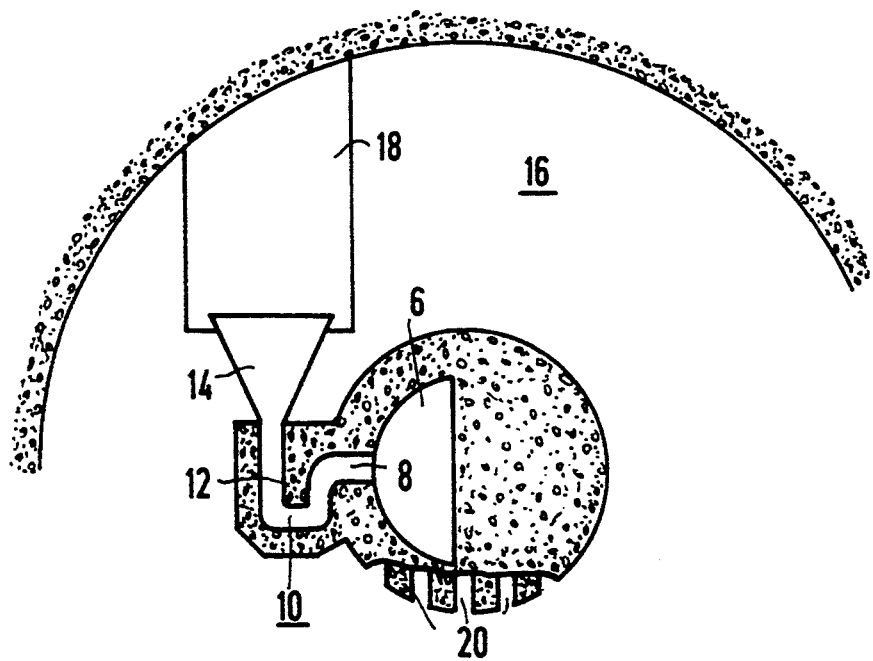

In FIG. 2, the device 12 for deflecting and slowing down the melt is formed by a concrete wall protrusion located transversely to the outlet opening 8 in the moderating chamber 10. As a result of this wall protrusion, an arc-shaped double deflection of the melt emerging from the shielding pit 6 is brought about.

Figure 3:
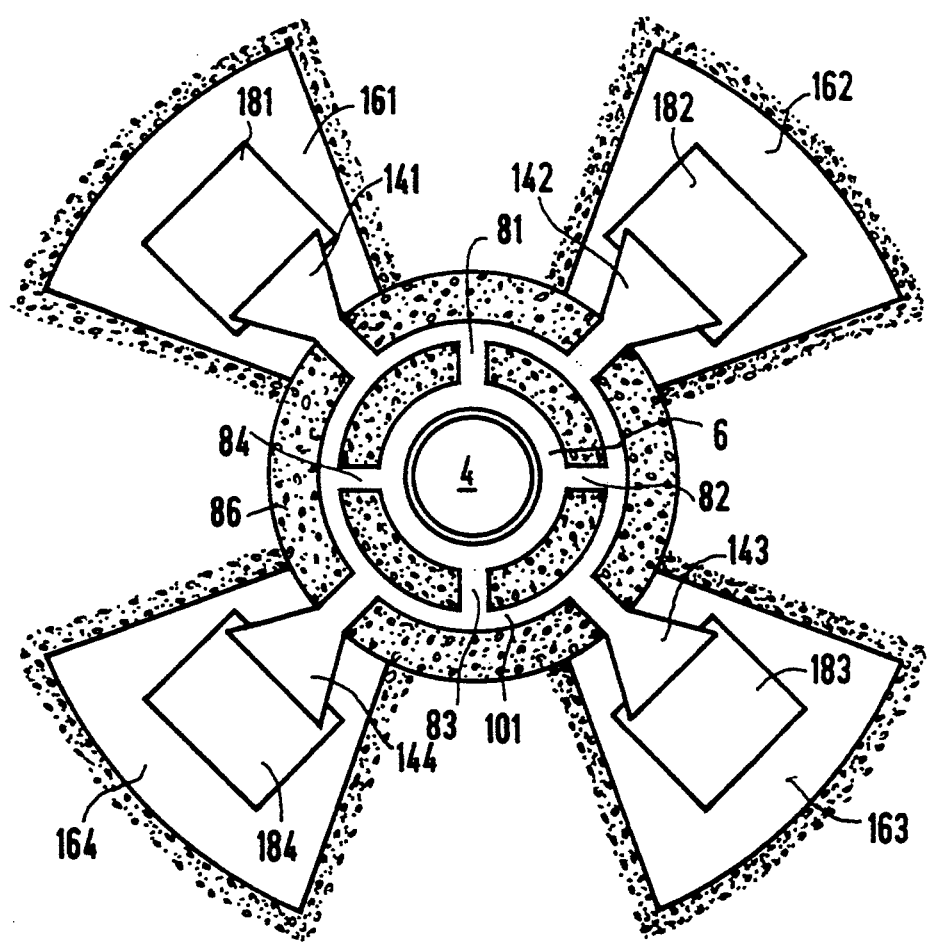
FIG. 3 is a fragmentary, horizontal-sectional view of an advantageous embodiment of the nuclear reactor system in the region of its foundation.

In the example of FIG. 3, four catch basins 161 through 164 are disposed in a star or radial pattern around the shielding pit 6. The shielding pit 6 is provided with 4 outlet openings 81 through 84, which discharge into an annular moderating cell 101 surrounding the shielding pit 6. Each of the catch basins 161 through 164 communicates with the moderating cell 101 through a respective drain channel 141, 142, 143 and 144, each of which leads to a respective fireproof-lined bottom region 181, 182, 183 and 184 of the respective catch basins 161, 162, 163 and 164. The catch basins 161 through 164 are offset relative to the outlet openings 81 through 84, so that a deflection and deceleration of the melt flow is brought about in this exemplary embodiment as well. Since the melt is split among a plurality of spatially separated catch basins 161 through 164, only some of the entire foundation structure of the reactor containment 2 is stressed, and the likelihood of failure of the reactor containment 2 and of the concrete structure that supports the reactor pressure vessel 4 is reduced.

Figure 4:
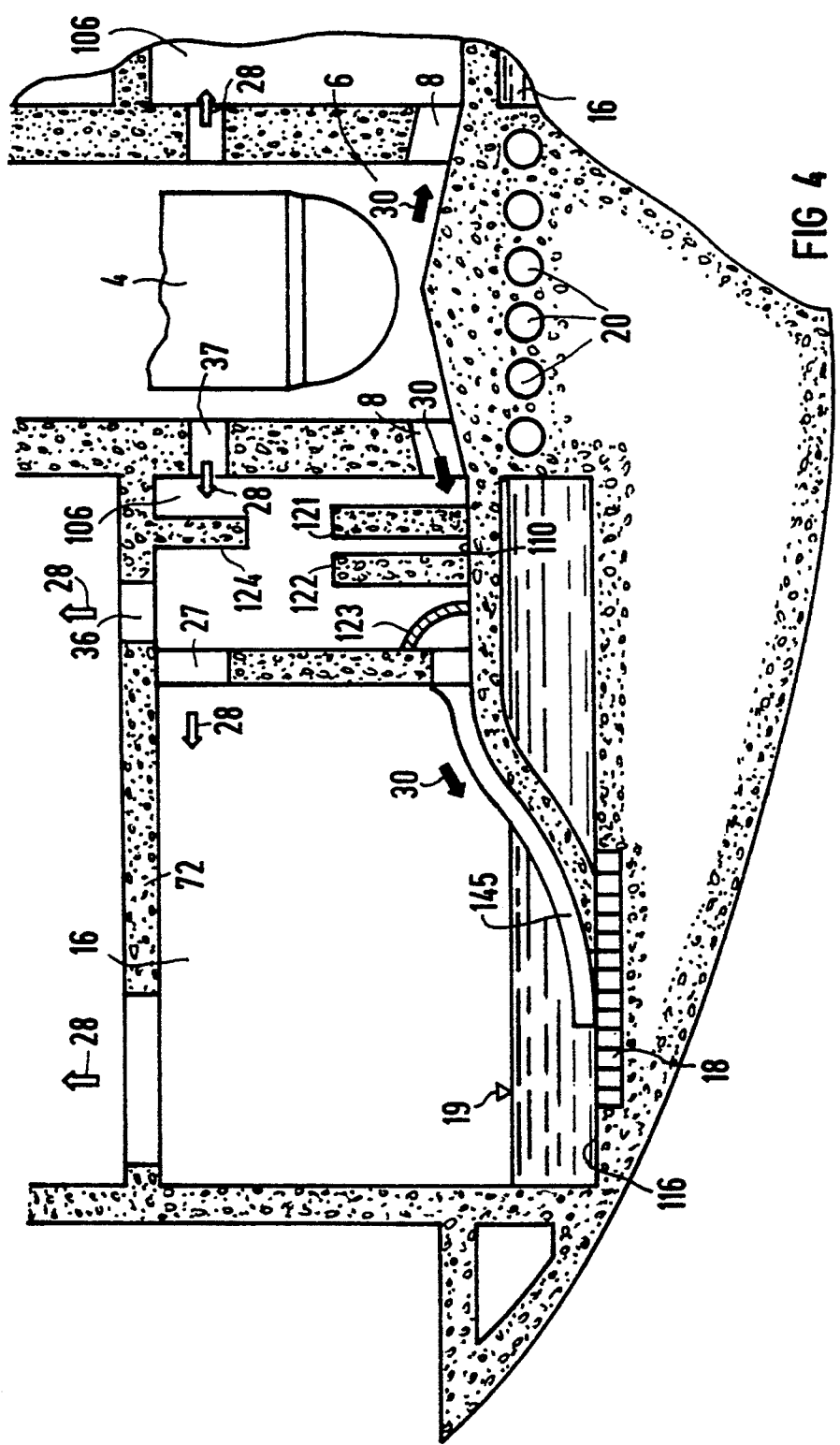
FIGS. 4 and 5 are respective fragmentary, vertical and horizontal-sectional views of a further preferred embodiment of a nuclear reactor system according to the invention.
Figure 5:
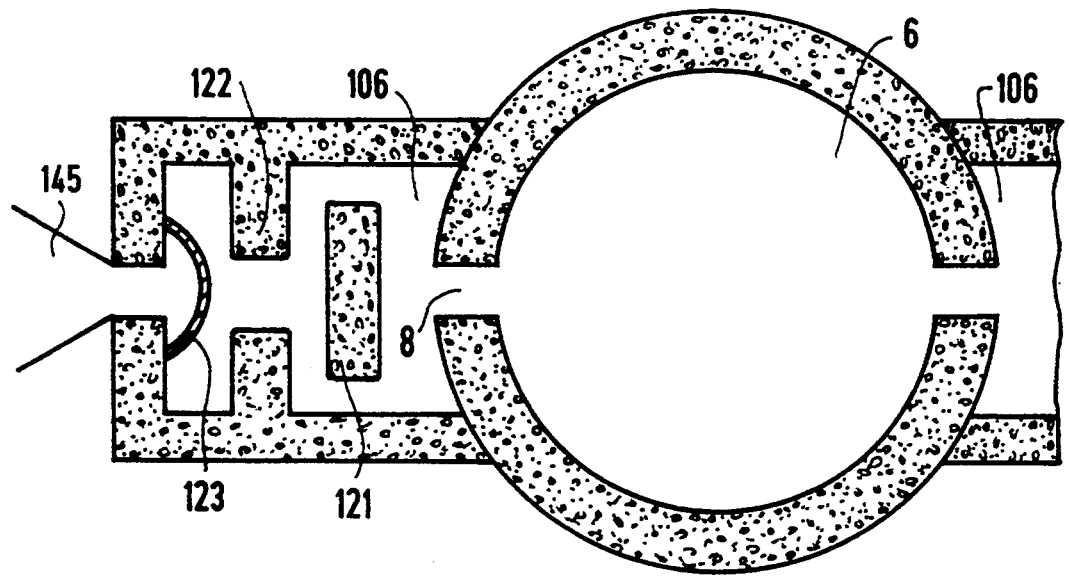

In FIGS. 4 and 5, a moderating cell 106 is provided between the catch basin 16 and the shielding pit 6. The moderating cell 106 has two walls 121 and 122 transverse to the direction 30 of the flow of melt emerging from the outlet opening 8. The walls 121 and 122 are disposed one after the other in the flow direction on the bottom 110 of the moderating cell 106. The walls 121 and 122 are preferably made of concrete. A wall 123 being disposed in front of the outlet channel 14 and being formed of a curved thin steel plate, is additionally provided. This wall 123 shields off the outlet to the drain channel 14 until such time as it is destroyed by the heat of the melt.

In addition to the pressure relief openings 27 discharging into the catch basin 16, the moderating cell 106 includes one further pressure relief opening 36 in the region of its ceiling 72, through which the water-steam can escape directly upward.

A pressure relief opening 37 additionally discharges from the shielding pit 6 into the moderating cell 106. Inside the moderating cell 106, a further baffle 124 is disposed opposite this pressure relief opening 37. The baffle 124 slows down the entrained melt components in the water-steam and deflects them onto the bottom 110 of the moderating cell 106.

Discharging into the catch basin 16 is a drain channel 145 having a bottom which has a steadily curved contour gradient as seen in a longitudinal section, which is made to conform to the shape of a projectile parabola in the region where it starts, so that the melt will not locally lift away from the channel 145 because of its horizontal flow speed. The drain channel 145 then discharges at a tangent onto the basin bottom 116, into a region that is provided with a fireproof lining 18.

In the example of FIGS. 4 and 5, two opposed moderating cells 106 and catch basins 16 are provided. The bottom of the shielding pit 6 then has a gabled or roof shape, in order to make it easier for the melt to flow away into the two opposed outlet openings 8.

We claim:

1. A nuclear reactor system having a water-cooled reactor, comprising:
   a reactor containment;
   a shielding pit inside said reactor containment, said shielding pit having a lower region with an outlet opening formed therein;
   a reactor pressure vessel disposed in said shielding pit;
   a moderating cell disposed downstream of said outlet opening and laterally adjacent said shielding pit, said moderating cell having a device for slowing down and diverting a melt flowing through said outlet opening; and
   a catch basin downstream of said moderating cell for receiving a melt, said catch basin being filled with a supply of water.

2. The nuclear reactor system according to claim 1, wherein said shielding pit has a bottom with a lowermost region, and said catch basin has a flat bottom being lower than said lowermost region.

3. The nuclear reactor system according to claim 1, wherein said shielding pit has a bottom with a lowermost region, said moderating cell has a bottom with a lowermost region, and said catch basin has a position and a size sufficient to hold a water supply for cooling the melt and coolant added from possible leakage, at a water surface level being maintained lower than said lowermost regions.

4. The nuclear reactor system according to claim 3, wherein said bottom of said catch basin is located at least one meter below said lowermost region of said bottom of said shielding pit.

5. The nuclear reactor system according to claim 4, wherein said bottom of said moderating cell is located at least one meter above said bottom of said catch basin.

6. The nuclear reactor system according to claim 2, wherein said bottom of said catch basin has an area of at least 100 m$^2$.

7. The nuclear reactor system according to claim 1, wherein said moderating cell has an upper region with a pressure relief opening formed therein for steam.

8. The nuclear reactor system according to claim 1, wherein said shielding pit has an upper region with a pressure relief opening formed therein.

9. The nuclear reactor system according to claim 8, including an additional device associated with said pressure relief opening, for slowing down and deflecting a mixture of steam and melt emerging through said pressure relief opening.

10. The nuclear reactor system according to claim 1, wherein said shielding pit has a bottom with a slope descending in the direction of said outlet opening.

11. The nuclear reactor system according to claim 1, wherein said shielding pit and said moderating cell have bottoms and walls formed of concrete with a thickness of at least one meter.

12. The nuclear reactor system according to claim 1, wherein said catch basin is disposed inside said reactor containment.

13. A nuclear reactor system having a water-cooled reactor, comprising:
reactor containment;
a shielding pit inside said reactor containment, said shielding pit having a lower region with an outlet opening formed therein;
a reactor pressure vessel disposed in said shielding pit;
a moderating cell disposed downstream of said outlet opening and laterally adjacent said shielding pit, said moderating cell having a device for slowing down and diverting a melt flowing through said outlet opening;
a catch basin downstream of said moderating cell for receiving a melt and a supply of water, said moderating cell having a bottom, and including a hollow chamber being disposed underneath said bottom of said moderating cell and being filled with water.

14. The nuclear reactor system according to claim 13, wherein said shielding pit has a bottom, and including a plurality of water-filled channels disposed underneath said bottom of said shielding pit.

15. A nuclear reactor system having a water-cooled reactor, comprising:
a reactor containment;
a shielding pit inside said reactor containment, said shielding pit having a lower region with an outlet opening formed therein;
a reactor pressure vessel disposed in said shielding pit;
a moderating cell disposed downstream of said outlet opening and laterally adjacent said shielding pit, said moderating cell having a device for slowing down and diverting a melt flowing through said outlet opening;
a catch basin downstream of said moderating cell for receiving a melt and a supply of water, said catch basin having a bottom, and including a continuously curved drainage channel being disposed between said moderating cell and said catch basin, for discharging at a tangent onto said bottom of said catch basin.

16. The nuclear reactor system according to claim 15, wherein said bottom of said catch basin has a discharge region downstream of said outlet channel with a fireproof lining.

17. The nuclear reactor system according to claim 1, including at least one other moderating cell, said moderating cells being disposed about the circumference of said shielding pit.

18. The nuclear reactor system according to claim 1, wherein said moderating cell annularly surrounds said shielding pit.

19. The nuclear reactor system according to claim 17, including other catch basins, said catch basins being disposed in a star pattern around said shielding pit.

20. The nuclear reactor system according to claim 18, including other catch basins, said catch basins being disposed in a star pattern around said shielding pit.

21. A method for operating a nuclear reactor system including a water-cooled reactor having a reactor containment; a shielding pit inside the reactor containment, the shielding pit having a lower region with an outlet opening formed therein and a bottom with a lowermost region; a reactor pressure vessel disposed in the shielding pit; a moderating cell disposed downstream of the outlet opening and horizontally adjacent the lowermost region of the shielding pit, the moderating cell having a device for slowing down and diverting a melt flowing through the outlet opening; and a catch basin being disposed downstream of the moderating cell and having a bottom for receiving a melt and a supply of water, which comprises:
covering the bottom of the catch basin with water during normal operation of the reactor, and maintaining the water in the catch basin at a surface level being lower than the lowermost region of the bottom of the shielding pit.

* * * * *